US010606568B2

United States Patent
Hou

(10) Patent No.: US 10,606,568 B2
(45) Date of Patent: Mar. 31, 2020

(54) METHOD AND APPARATUS FOR COMPILING COMPUTER LANGUAGE

(71) Applicant: Alibaba Group Holding Limited, Grand Cayman (KY)

(72) Inventor: Zhenyu Hou, Hangzhou (CN)

( * ) Notice: Subject to any disclaimer, the term of this patent is extended or adjusted under 35 U.S.C. 154(b) by 0 days.

(21) Appl. No.: 16/144,792

(22) Filed: Sep. 27, 2018

(65) Prior Publication Data

US 2019/0026087 A1    Jan. 24, 2019

Related U.S. Application Data

(63) Continuation of application No. PCT/CN2017/077910, filed on Mar. 23, 2017.

(30) Foreign Application Priority Data

Mar. 31, 2016 (CN) .......................... 2016 1 0200937

(51) Int. Cl.
*G06F 8/41* (2018.01)

(52) U.S. Cl.
CPC ................ *G06F 8/42* (2013.01); *G06F 8/427* (2013.01)

(58) Field of Classification Search
None
See application file for complete search history.

(56) References Cited

U.S. PATENT DOCUMENTS

| 5,487,147 A | 1/1996 | Brisson |
| 5,673,390 A | 9/1997 | Mueller |
| 7,281,018 B1 * | 10/2007 | Begun ................... G06F 17/218 |
| 8,359,305 B1 * | 1/2013 | Burke ............... G06F 16/90348 |
| | | 707/706 |
| 2002/0026308 A1 * | 2/2002 | Osborne ............... G06F 17/271 |
| | | 704/9 |
| 2002/0078406 A1 * | 6/2002 | Kondoh .................... G06F 8/33 |
| | | 714/48 |
| 2004/0250237 A1 * | 12/2004 | Simonyi ................... G06F 8/33 |
| | | 717/105 |
| 2007/0169050 A1 | 7/2007 | Barsness et al. |
| 2008/0097974 A1 * | 4/2008 | Chen ................... G06F 11/3684 |

(Continued)

FOREIGN PATENT DOCUMENTS

| CN | 103019801 A | 4/2013 |
| CN | 103645986 A | 3/2014 |

OTHER PUBLICATIONS

Translation of the International Search Report from corresponding Chinese PCT Application No. PCT/CN2017/077910, dated Jun. 29, 2017, 2 pages.

(Continued)

*Primary Examiner* — Philip Wang
(74) *Attorney, Agent, or Firm* — Lee & Hayes, P.C.

(57) ABSTRACT

A method including detecting, according to a preset syntax, whether an incorrect syntax unit exists in a to-be-compiled statement; when the detection result is yes, determining whether a child node at which the syntax unit is located is an optional node of a corresponding parent node; and when the determination result is yes, deleting the syntax unit. The present disclosure addresses the problem of low computer language compiling efficiency caused by the lack of a fault-tolerant computer language compiling technology in the conventional techniques.

20 Claims, 12 Drawing Sheets

(56) References Cited

U.S. PATENT DOCUMENTS

| | | | | |
|---|---|---|---|---|
| 2009/0222799 A1* | 9/2009 | Stewart | .................. | G06F 8/427 |
| | | | | 717/143 |
| 2011/0283270 A1* | 11/2011 | Gass | ........................ | G06F 8/65 |
| | | | | 717/168 |
| 2015/0128114 A1* | 5/2015 | O'Hara | ..................... | G06F 8/71 |
| | | | | 717/143 |
| 2016/0124723 A1* | 5/2016 | Ma | .......................... | G06F 16/00 |
| | | | | 717/144 |
| 2017/0161177 A1* | 6/2017 | Bird | ................... | G06F 11/3672 |
| 2017/0329694 A1* | 11/2017 | Yoon | .................. | G06F 11/3608 |

OTHER PUBLICATIONS

Translation of the Written Opinion from corresponding Chinese PCT Application No. PCT/CN2017/077910, dated Jun. 29, 2017, 5 pages.

Barnard, et. al., "Hierarchic syntax error repair for LR grammars", International Journal of Information and Computer Sciences, vol. 11, No. 4, Aug. 1, 1982, pp. 231-258.

Cao, et al., "Design and implementation for SQL parser based on Antlr", Computer Engineering and Technology (ICCET), Apr. 16, 2010, pp. 276-279.

Extended European Search Report dated Nov. 18, 2019, for European Patent Application No. 17773148.6, 9 pages.

\* cited by examiner

METHOD AND APPARATUS FOR COMPILING COMPUTER LANGUAGE

CROSS REFERENCE TO RELATED PATENT APPLICATIONS

This application claims priority to and is a continuation of PCT Patent Application No. PCT/CN2017/077910, filed on 23 Mar. 2017, which claims priority to Chinese Patent Application No. 201610200937.2 filed on 31 Mar. 2016 and entitled "METHOD AND APPARATUS FOR COMPILING COMPUTER LANGUAGE", which are incorporated herein by reference in their entirety.

TECHNICAL FIELD

The present disclosure relates to the field of computer technology applications, and, more particularly, to methods and apparatuses for compiling computer languages.

BACKGROUND

With the wide application of computer languages, computer language compiling has become an indispensable key step in the process of using a computer language. A manually written computer language may have initial syntax errors in terms of the computer language syntax due to subjectivity. Therefore, how to efficiently and correctly compiling a manually written computer language has become a problem to be solved by those skilled in the art.

The computer language is analyzed and compiled to be converted from a language easily understood by human to a language easily understood by a computer. The basic compiling process is changing source codes into an authentication Token sequence, then changing the authentication Token sequence into a Parse Tree (PST for short) according to a defined syntax grammar, and further performing semantic analysis to change the PST into an Abstract Syntax Tree (AST for short). The resulting AST is understood by the computer.

However, the problem is that the analyzed and compiled source codes are entered by engineers and often have various errors. For example, when a simple Token contains a character that should not be used, most of the existing compilers may tolerate errors to some extent in the phase of generating the PST and compile the remaining source codes as much as possible so as to find more errors. However, if the PST cannot be converted to the corresponding AST due to the error, the entire AST generation phase will fail as the AST is a tree-like nested structure in which a parent node is dependent on correct generation of all child nodes. The failure in generating the AST leads to unavailability of AST-based functions, such as prompting various type errors during compiling, prompting functions that might be used by the user in an Integrated Development Environment (IDE), etc.

Each syntax unit of the parsed language is processed in a special manner under the conventional techniques to determine whether the unit may be further analyzed. However, this may hardly be fully implemented for a computer language in reality due to the heavy workload. The AST is generated as far as possible according to the method mentioned above, but the implementation in reality is difficult as the workload is too heavy and errors occur easily.

No effective solution has been proposed to solve the problem of low computer language compiling efficiency caused by the lack of a fault-tolerant computer language compiling technology in the conventional techniques.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The example embodiments of the present disclosure provide methods and apparatuses for compiling computer languages to at least address the problem of low computer language compiling efficiency caused by the lack of a fault-tolerant computer language compiling technology in the conventional techniques.

According to an aspect of the example embodiments of the present disclosure, a method for compiling a computer language is provided, including: detecting, according to a preset syntax, whether an incorrect syntax unit exists in a to-be-compiled statement; when the detection result is yes, determining whether a child node at which the syntax unit is located is an optional node of a corresponding parent node; and when the determination result is yes, deleting the syntax unit.

According to another aspect of the example embodiments of the present disclosure, an apparatus for compiling a computer language is provided, including: a detection module configured to detect, according to a preset syntax, whether an incorrect syntax unit exists in a to-be-compiled statement; a determining module configured to: when the detection result is yes, determine whether a child node at which the syntax unit is located is an optional node of a corresponding parent node; and a first execution module configured to, when the determination result is yes, delete the syntax unit.

In the example embodiment of the present disclosure, the techniques of the present disclosure, according to a preset syntax whether an incorrect syntax unit exists in a to-be-compiled statement; when the detection result is yes, determine whether a child node at which the syntax unit is located is an optional node of a corresponding parent node; and when the determination result is yes, delete the syntax unit. Therefore, the objective of improving the success rate of compiling when there are a lot of errors in the computer language is achieved, which further achieves the technical effect of improving the compiling efficiency, and further resolves the problem of low computer language compiling efficiency caused by the lack of a fault-tolerant computer language compiling technology in the conventional techniques.

BRIEF DESCRIPTION OF THE DRAWINGS

The accompanying drawings described herein are used to provide further understanding of the present disclosure, and constitute a part of the present application. The example embodiments of the present disclosure and descriptions of the example embodiments are used to explain the present disclosure, and are not intended to constitute inappropriate limitations to the present disclosure. In the accompanying drawings.

DETAILED DESCRIPTION

In order to enable those skilled in the art better understand the solution in the present disclosure, the technical solutions in the example embodiments of the present disclosure will be described clearly and completely below with reference to the accompanying drawings in the example embodiments of the present disclosure. It is apparent that the described example embodiments are merely a part of rather than all the example embodiments of the present disclosure. Based on the example embodiments of the present disclosure, all other example embodiments derived by those of ordinary skill in the art without creative efforts shall fall within the protection scope of the present disclosure.

It should be noted that terms such as "first" and "second" in the specification, the claims and the accompanying drawings of the present disclosure are used to distinguish similar objects, and are not necessarily used to describe a specific sequence or order. It should be understood that data used in such a manner may be exchanged in proper situations, so that the example embodiments of the present disclosure described here may be implemented in sequences other than those shown or described here. Moreover, terms "include" and "have" and any variation of them are intended to cover a non-exclusive inclusion. For example, a process, method, system, product or device including a series of steps or units is not necessarily limited to those steps or units clearly listed, but may include other steps or units that are not clearly listed or are inherent to the process, method, product or device.

Technical terms involved in the example embodiments of the present application include:

Parse Tree, PST for short; and

Abstract Syntax Tree, AST for short.

Example Embodiment 1

According to the example embodiments of the present application, an example embodiment of a method for compiling a computer language is further provided. It should be noted that steps shown in the flowchart of the accompanying drawing may be performed in a computer system such as a group of computer executable instructions. Moreover, although a logic order is shown in the flowchart, in some cases, the shown or described steps may be performed in an order different from that described here.

Figure 1:
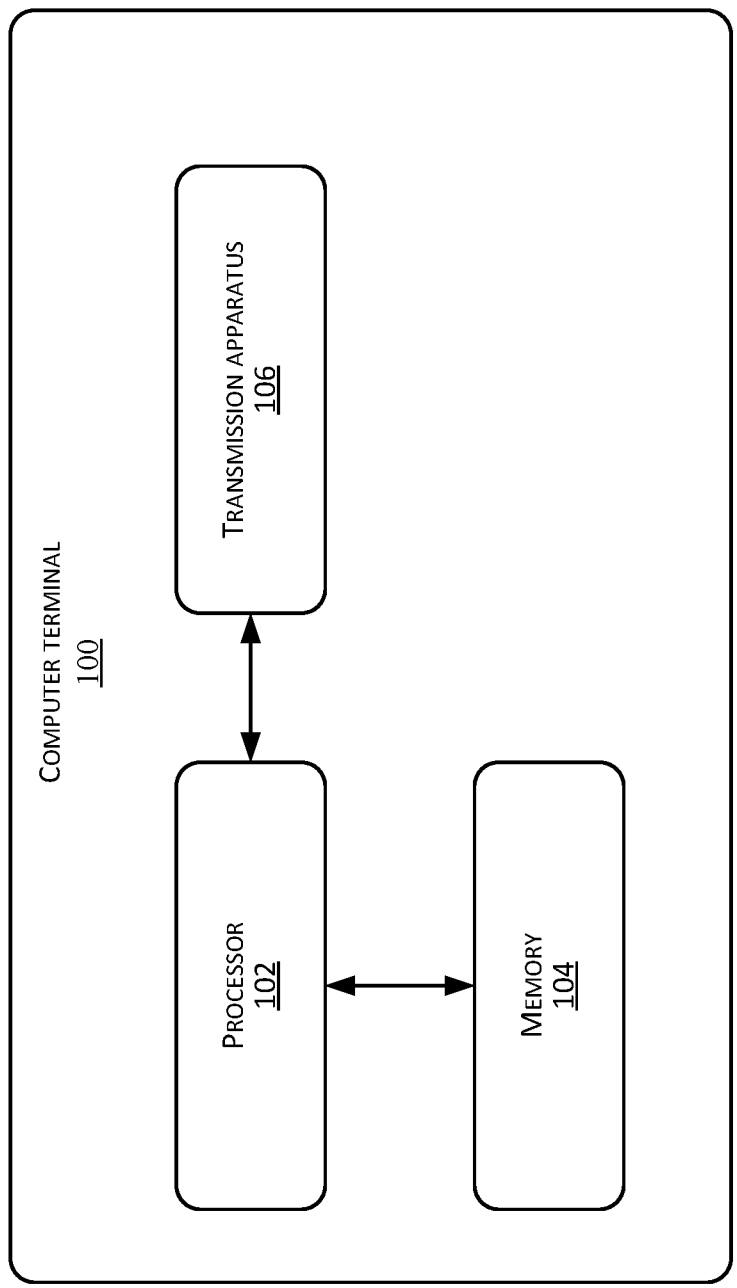
FIG. 1 is a block diagram of a hardware structure of a computer terminal of a method for compiling a computer language according to an example embodiment of the present disclosure.

The method example embodiment provided in Example embodiment 1 of the present application may be performed in a mobile terminal, a computer terminal, or a similar arithmetic device. By using running on a computer terminal as an example, FIG. 1 is a block diagram of a hardware structure of a computer terminal of a method for compiling a computer language according to an example embodiment of the present disclosure. As shown in FIG. 1, a computer terminal 100 may include one or more (merely one is shown in the figure) processors 102 (the processor 102 may include, but is not limited to, a processing apparatus, for example, a microprocessor such as a microprocessor MCU or a programmable logic device such as an FPGA), a memory 104 configured to store data, and a transmission apparatus 106 having a communication function. Those of ordinary skill in the art may understand that the structure shown in FIG. 1 is merely schematic, and is not intended to limit the structure of the above electronic apparatus. For example, the computer terminal 10 may further include more or fewer components than those shown in FIG. 1 or have a configuration different from that shown in FIG. 1.

The memory 104 may be configured to store a software program of application software and a module, e.g., a program instruction/module corresponding to the method for compiling a computer language in the example embodiment of the present disclosure. The memory 104 is an example of the computer readable medium.

The computer readable medium includes non-volatile and volatile media as well as movable and non-movable media, and may implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition of this text, the computer readable medium or media do not include transitory media, such as a modulated data signal and a carrier.

The processor 102 runs the software program and module stored in the memory 104 to execute various functional applications and data processing, i.e., implement the vulnerability detection method of the foregoing application. The memory 104 may include a high-speed random access memory, and may further include a non-volatile memory, e.g., one or more magnetic storage apparatuses, flash memories, or other non-volatile solid-state memories. In some examples, the memory 104 may further include memories remotely disposed with respect to the processor 102, and the remote memories may be connected to the computer terminal 10 through a network. Examples of the network include, but are not limited to, the Internet, an Intranet, a local area network, a mobile communication network, and their combinations.

The transmission apparatus 106 is configured to receive or send data via a network. A specific example of the network may include a wireless network provided by a communications provider of the computer terminal 10. In an example, the transmission apparatus 106 includes a Network Interface Controller (NIC), which may be connected to another network device via a base station to communicate with the Internet. In an example, the transmission apparatus 106 may be a Radio Frequency (RF) module, which is configured to communicate with the Internet in a wireless manner.

Figure 2:
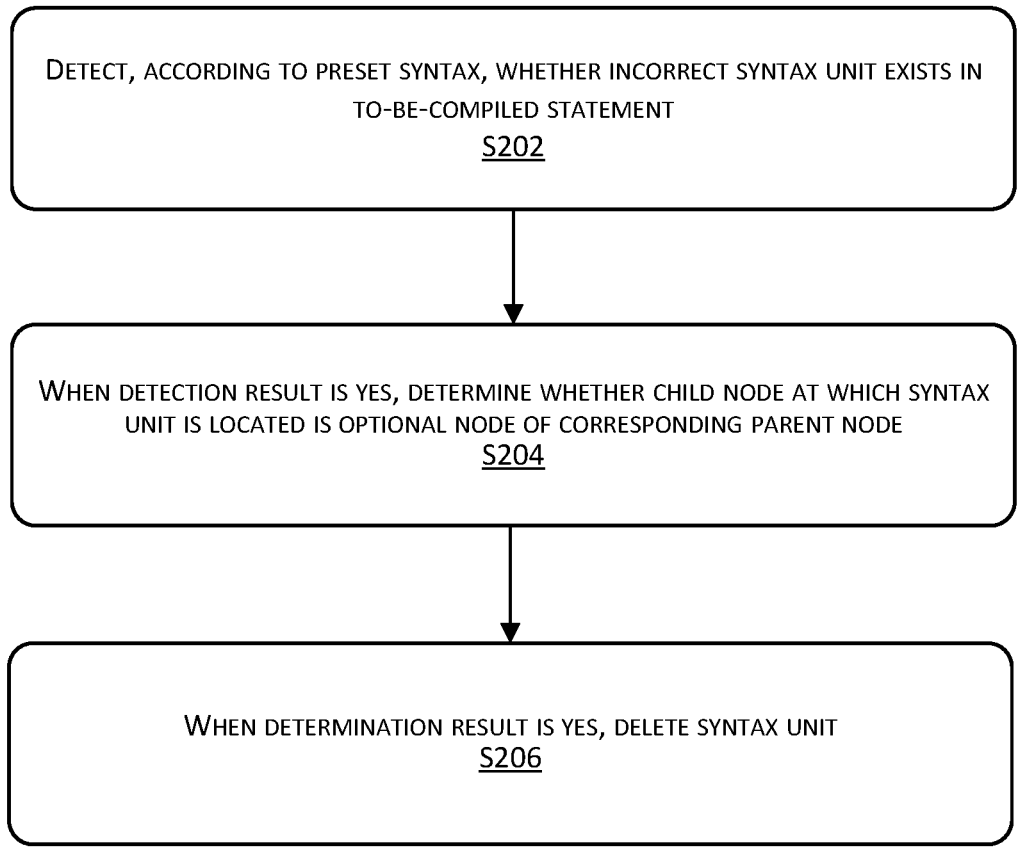
FIG. 2 is a flowchart of a method for compiling a computer language according to Example embodiment 1 of the present disclosure.

In the above running environment, the present application provides a method for compiling a computer language as shown in FIG. 2. FIG. 2 is a flowchart of a method for compiling a computer language according to Example embodiment 1 of the present disclosure.

Step S202: whether an incorrect syntax unit exists is detected according to a preset syntax in to-be-compiled statement.

In the foregoing step S202 of the present application, the method for compiling a computer language according to the example embodiment of the present application may be applied to a compiling process of changing source codes into a Token sequence, changing the Token sequence into a PST according to a defined syntax grammar, and performing semantic analysis to change the PST into an AST. In the conventional techniques, once a corresponding position in the PST cannot be transformed into the AST, the whole AST generation phase will fail, thus causing the problem that AST-based functions are unavailable. To avoid the foregoing problem, in the method for compiling a computer language according to the example embodiment of the present application, a PST computer language is traversed first during compiling of the computer language to check whether an incorrect syntax unit exists.

Specifically, it is assumed that a to-be-compiled statement is "SELECT userId, userName FROM user t WHERE userAge >20". According to the preset syntax, a to-be-compiled statement needs to include a "Select" part, a "FROM" and/or a "WHERE" part. As may be seen from the to-be-compiled statement provided in the foregoing, "Select", "FROM" and "WHERE" have clear semantic meanings and work order logics without any incorrect symbols. Therefore, in the process of detecting the to-be-compiled statement, if no semantic error exists in "Select", "FROM" and/or "WHERE", it is considered that a complete and correct AST may be generated. It should be noted that "Select", "FROM" and/or "WHERE" are the syntax units provided in the example embodiment of the present application.

Step S204: When the detection result is yes, whether a child node at which the syntax unit is located is an optional node of a corresponding parent node is determined.

Based on the detection of step S202, in the foregoing step S204 of the present application, when the detection result is that the to-be-compiled statement has an incorrect syntax unit, it is first determined whether a child node at which the syntax unit is located is an optional node of a corresponding parent node. Based on the AST mentioned in step S202, the AST is a nested tree structure in which a parent node depends on correct generation of all child nodes. Moreover, in the method for compiling a computer language according to the example embodiment of the present application, when an optional node has an error, a syntax unit corresponding to the optional node may be deleted to ensure correct compiling of mandatory nodes, thus ensuring the maximum correct AST during generation of the AST. That is, when the determination result is yes, step S206 is performed, and when the determination result is no, step S208 is performed.

Figure 3:
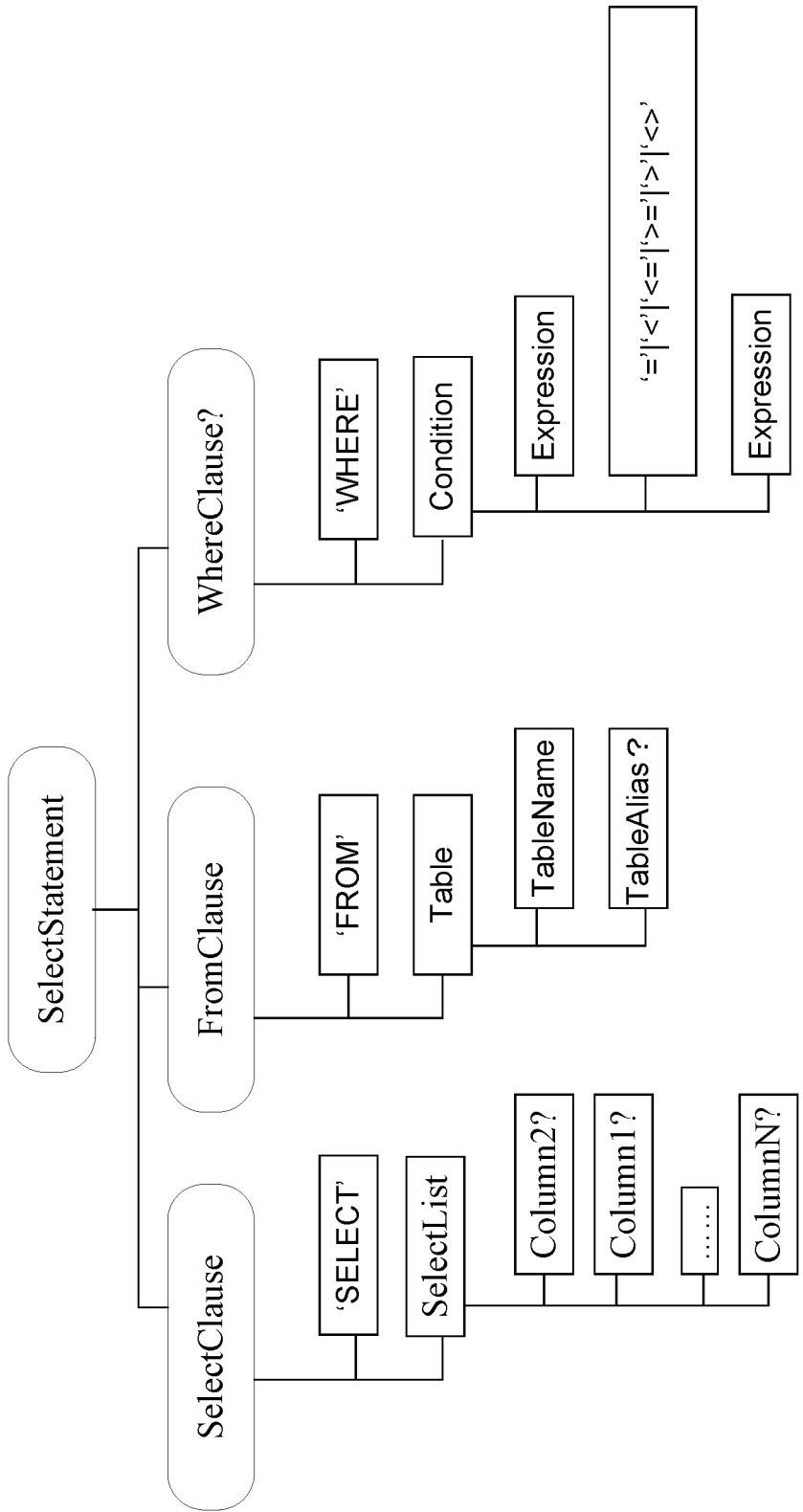
FIG. 3 is a schematic structural diagram of a target AST tree of a SELECT statement in a simplified SQL according to Example embodiment 1 of the present disclosure.

FIG. 3 is a schematic structural diagram of a target AST tree of a SELECT statement in a simplified SQL according to Example embodiment 1 of the present disclosure. As shown in FIG. 3, all nodes labeled with a postfix "?" in the target AST tree are optional in their parent nodes. For example, a select statement SelectStatement needs to have a select clause sequence SelectClause and a source clause sequence FromClause, but does not necessarily have a WHERE clause sequence WhereClause. The SelectStatement is still correct without the WhereClause, but is an illegal statement without the SelectClause and FromClause.

Step S206: When the determination result is yes, the syntax unit is deleted.

Based on the determination result of step S204, in the foregoing step S206 of the present application, when the detection result is that the child node at which the syntax unit is located is the optional node in the corresponding parent node, the syntax unit is deleted.

Specifically, still referring to FIG. 3 in step S204, it is assumed that a source alias TableAlias in the FROM clause sequence in the to-be-compiled statement has an error. When it is determined that the source alias TableAlias is the optional node in the FROM clause sequence, the condition expression sequence is deleted, and the remaining correct syntax unit parts in the SelectClause and the FromClause are compiled.

Figure 4:
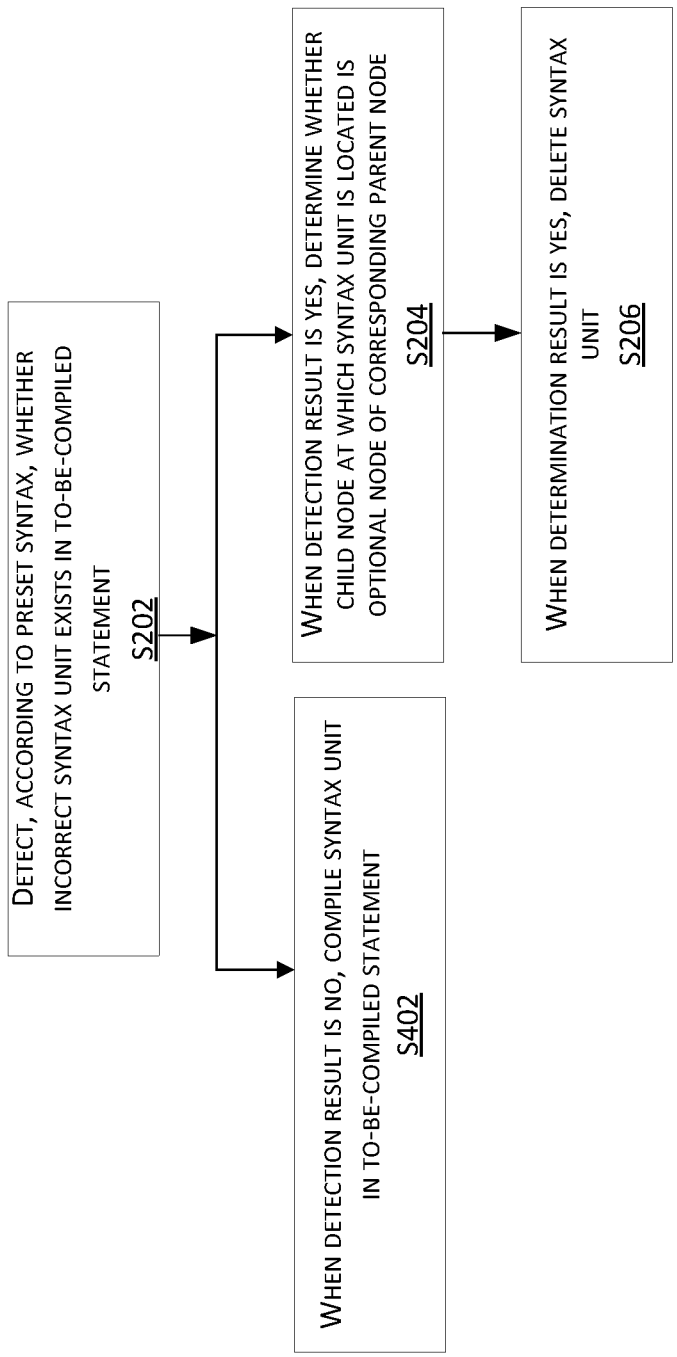
FIG. 4 is a flowchart of a method for compiling a computer language according to Example embodiment 1 of the present disclosure.

Moreover, FIG. 4 is a flowchart of a method for compiling a computer language according to Example embodiment 1 of the present disclosure. As shown in FIG. 4, when syntax units in the to-be-compiled statement are not detected according to the preset syntax in step S202, at S402, the syntax units in the to-be-compiled statement are compiled.

As may be seen, in the solution provided in Example embodiment 1 of the present disclosure, it is detected according to a preset syntax whether an incorrect syntax unit exists in a to-be-compiled statement; when the detection result is yes, it is determined whether a child node at which the syntax unit is located is an optional node of a corresponding parent node; and when the determination result is yes, the syntax unit is deleted. Therefore, the objective of improving the success rate of compiling when there are a lot of errors in the computer language is achieved, thus achieving the technical effect of improving the compiling efficiency, and further addressing the problem of low computer language compiling efficiency caused by the lack of a fault-tolerant computer language compiling technology in the conventional techniques.

Figure 5:
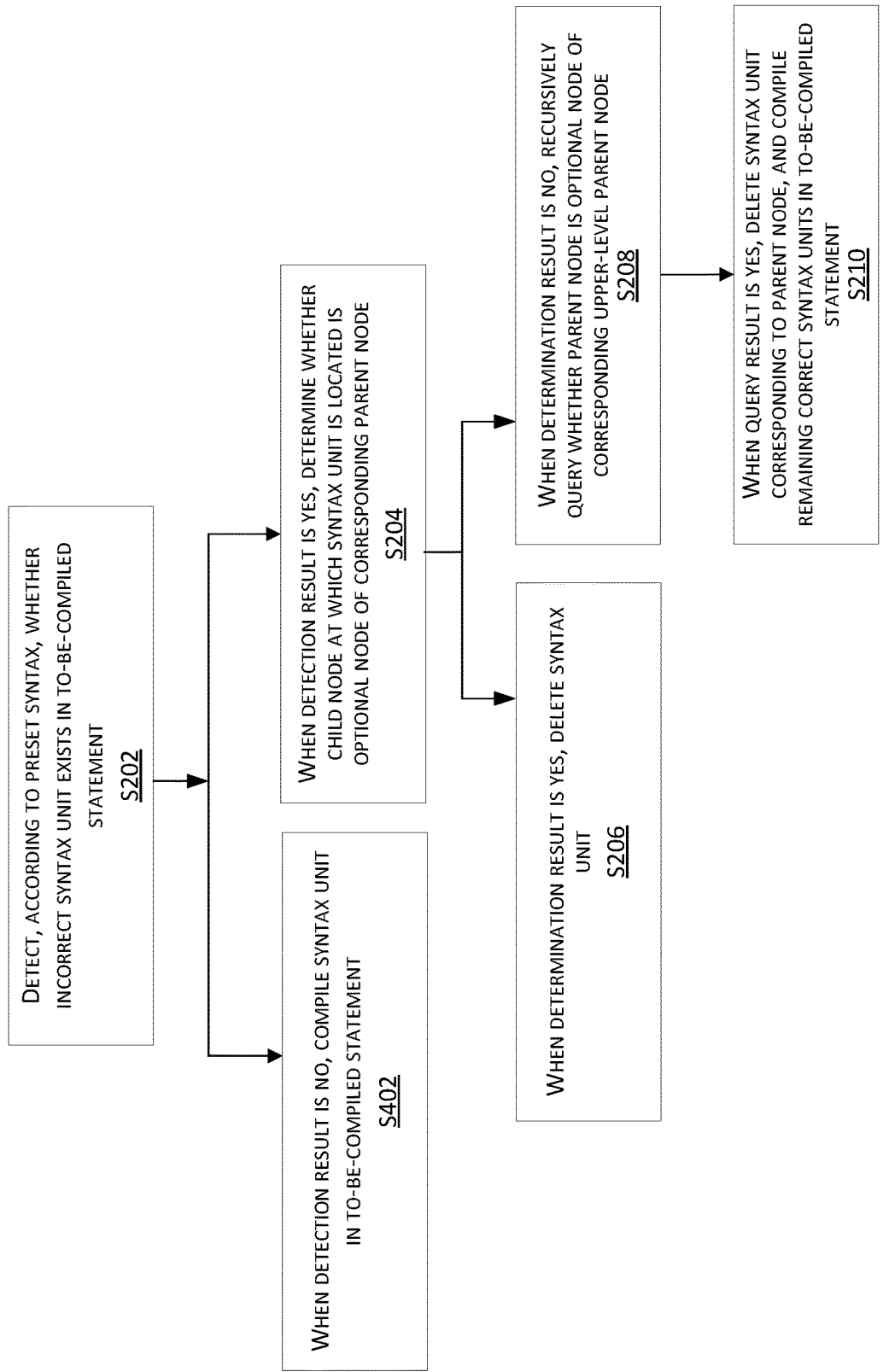
FIG. 5 is a flowchart of another method for compiling a computer language according to Example embodiment 1 of the present disclosure.

Optionally, FIG. 5 is a flowchart of another method for compiling a computer language according to Example embodiment 1 of the present disclosure. As shown in FIG. 5, after step S204 of determining whether the child node at which the syntax unit is located is the optional node in the corresponding parent node, the method for compiling a computer language according to the example embodiment of the present application further includes the following step:

Step S208: When the determination result is no, whether the parent node is the optional node of a corresponding upper-level parent node is recursively queried.

Based on the determination result of step S204, in the foregoing step S208 of the present application, when the determination result is that the child node at which the syntax unit is located is not the optional node in the corresponding parent node, that is, the child node at which the syntax unit is located is a mandatory node in the corresponding parent node, it is recursively queried whether the parent node corresponding to the child node at which the syntax unit is located is an optional node in the parent node.

Specifically, still referring to FIG. 3 in step S204, it is assumed that a condition expression sequence in the WHERE clause sequence in the to-be-compiled statement has an error. As shown in FIG. 3, the condition expression sequence Condition is not an optional node in WhereCondition. In this case, it is necessary to query to further check whether the parent node WhereClause of the WhereCondition is an optional node. As shown in FIG. 3, the WhereCondition is still not an optional node in WhereClause, and it will be queried whether the WhereClause is an optional node in the parent node SelectStatement.

As shown in FIG. 3, in the method for compiling a computer language according to the example embodiment of the present application, the step of recursively querying whether the parent node is an optional node of a corresponding upper-level parent node is described specifically in the following:

Manner 1: An upper-level node of the corresponding parent node of the child node at which the syntax unit is located is queried, and the query is performed recursively level by level.

It is assumed that a current to-be-compiled statement is "SELECT userId, userName FROM user t WHERE userAge*20".

As may be seen, Expression in WhereClause has an error, that is, "*" in "userAge*20" is an unrecognizable identifier in FIG. 3.

Therefore, as shown in FIG. 3, the parent node of Expression is Condition, and the parent node WhereClause of the Condition is further queried since the Condition is a mandatory node.

Manner 2: A category of the corresponding parent node of the child node at which the syntax unit is located is queried, and a node type at the category node is queried.

Still referring to the example in Manner 1, if Expression in WhereClause has an error, the WhereClause to which the Expression belongs is queried directly as the Expression is a syntax unit in the WhereClause.

With reference to Manner 1 and Manner 2, the method for compiling a computer language according to the example embodiment of the present application is illustrated by using an example in which the implementation in Manner 1 is taken as an example manner. The implementation manner is not specifically limited as long as the method for compiling a computer language according to the example embodiment of the present application may be implemented.

Step S210: When the query result is yes, the syntax unit corresponding to the parent node is deleted, and remaining correct syntax units in the to-be-compiled statement are compiled.

Based on step S208 of recursively querying whether the parent node is an optional node in the corresponding parent node, in the foregoing step S210 of the present application, when the query result is that the parent node is an optional node in the corresponding parent node, the syntax unit corresponding to the parent node is deleted, and the remaining correct syntax units in the to-be-compiled statement are compiled.

Specifically, still referring to the example in step S208, when it is obtained through query that the WhereClause is an optional node in the parent node SelectStatement, the whole part corresponding to the WhereClause is trimmed, the remaining part still may be used to generate a legal AST of the SelectStatement without the incorrect WhereClause, and still may be used to support all subsequent AST-based functions.

In the example embodiment of the present application, according to information about whether an AST node is optional in its parent node in a syntax structure, incorrect PST nodes may be trimmed automatically such that all PSTs that may be used to generate a correct AST may still be used to generate the AST, and all nodes causing an incorrect AST are ignored. The generated AST is just the maximum correct AST that may be generated, and may still support AST-based applications to the maximum extent. Whether a node is optional in its parent node may be obtained automatically from a syntax definition of a computer language to be analyzed. General syntax definitions and compiling code generators such as Yacc, Antlr, and JFlex may all provide this function directly or indirectly.

Optionally, the syntax units in the to-be-compiled statement include a select clause sequence and a source clause sequence, wherein the select clause sequence includes a select list, any column in the select list being the optional node in the select list; and the source clause sequence includes a source table name and/or a source alias, the source alias being the optional node in the source clause sequence.

Optionally, when the incorrect syntax unit is the select list in the select clause sequence, step S204 of determining whether the child node at which the syntax unit is located is the optional node in the corresponding parent node includes the following steps:

Step1: It is determined whether each column in the select list has a syntax error.

In Step1 in the foregoing step S204 of the present application, when the select list in the select clause sequence in the to-be-compiled statement has an error, it is determined whether each column in the select list has a syntax error.

Specifically, referring to FIG. 3, each column, i.e., Column1 . . . Column N, in the select list is optional. Therefore, it is necessary to determine whether each column in the select list has a syntax error. When the determination result is yes, Step4 is performed, and when the determination result is no, Step2 and Step3 are performed.

Step2: When the determination result is no, it is determined whether at least one column in the select list has a syntax error.

Based on the determination in Step1, in the foregoing Step2 of the present application, when the determination result is that not all columns in the select list have a syntax error, it is necessary to determine whether at least one column in the select list has a syntax error.

Specifically, referring to FIG. 3, when it is assumed that not all columns in the select list SelectList in the select clause sequence SelectClause have a syntax error, it is necessary to determine the number of columns having syntax errors in the select list SelectList.

Step3: When the determination result is that at least one column in the select list has a syntax error, it is determined whether the select list is the optional node in the select clause sequence.

Based on the determination in Step2, in the foregoing Step3 of the present application, when the determination result is that at least one column in the select list has a syntax error, it is determined whether the select list is the optional node in the select clause sequence.

Referring to FIG. 3, specifically, when the determination result is that at least one column in the select list has a syntax error, it is determined whether the select list SelectList is the optional node in the select clause sequence SelectClause, as shown in FIG. 3.

Step4: When the determination result is that each column in the select list has a syntax error, it is determined that the to-be-compiled statement is an illegal statement.

In the foregoing Step4 of the present application, when the determination result is that each column in the select list has a syntax error, i.e., if all Columns each have an error, the whole SelectStatement cannot be generated correctly. However, this is an expected result because a Select statement without the select list is illegal.

Figure 6:
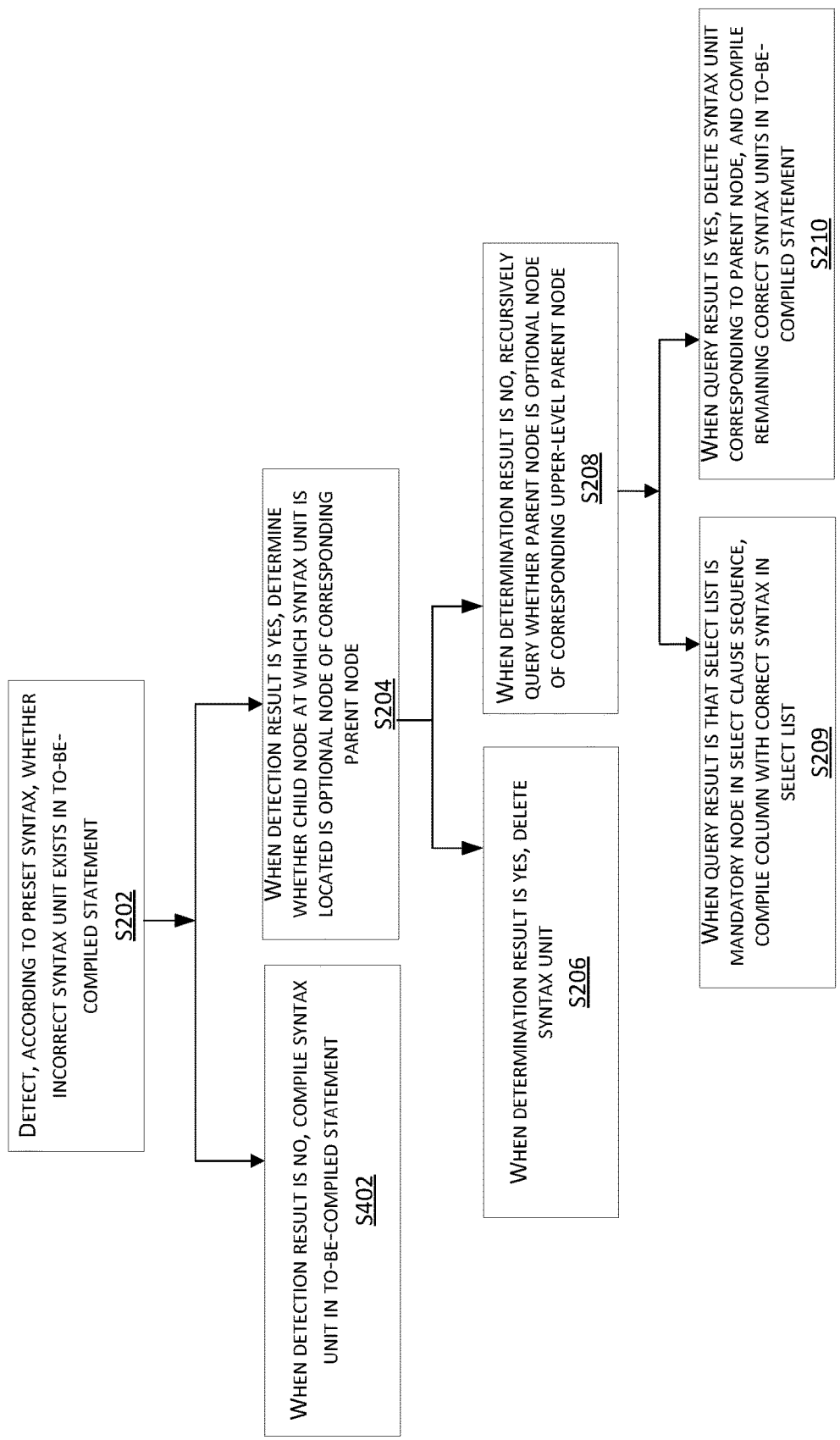
FIG. 6 is a flowchart of still another method for compiling a computer language according to Example embodiment 1 of the present disclosure.

Optionally, FIG. 6 is a flowchart of still another method for compiling a computer language according to Example embodiment 1 of the present disclosure. As shown in FIG. 6, after step S208 of recursively querying whether the parent node is the optional node of the corresponding upper-level parent node, the method for compiling a computer language according to the example embodiment of the present application further includes the following step:

Step S209: When the query result is that the select list is a mandatory node in the select clause sequence, columns with correct syntax in the select list are compiled.

When the select clause sequence has an incorrect syntax unit, after it is recursively queried whether the parent node is the optional node in a corresponding parent node based on step S208, in the foregoing step S209 in the present application, if the query result is that the select list is a mandatory node in the select clause sequence, columns with correct syntax in the select list are compiled.

Specifically, still referring to the example in the foregoing step S204, it is assumed that the select list SelectList has an incorrect Column, and it is recursively queried whether the parent node SelectList of the Column is an optional node. When the query result is that the parent node SelectList is a mandatory node of the parent node SelectClause, columns having correct syntax in the SelectList are compiled.

Optionally, when the incorrect syntax unit is a source alias in the source clause sequence, step S204 of determining whether the child node at which the syntax unit is located is the optional node in the corresponding parent node includes the following step:

Step1: It is determined whether the source alias is the optional node in the source clause sequence.

In Step1 in the foregoing step S204 of the present application, when the incorrect syntax unit is the source alias in the source clause sequence, it is necessary to determine whether the source alias is the optional node in the source clause sequence.

Further, optionally, step S206 of deleting the syntax unit when the determination result is yes includes the following step:

Step1: When the determination result is that the source alias is the optional node in the source clause sequence, the syntax unit corresponding to the source alias is deleted, and remaining correct syntax units in the to-be-compiled statement are compiled.

Based on the determination of the foregoing step S204, in Step1 in the foregoing step S206 of the present application, when the determination result is that the source alias is the optional node in the source clause sequence, the syntax unit corresponding to the source alias is deleted, and the remaining correct syntax units in the to-be-compiled statement are compiled.

Specifically, as shown in FIG. 3, the source alias TableAlias is an optional node. Therefore, the syntax unit corresponding to the source node is deleted, and the remaining correct syntax units in the to-be-compiled statement are compiled. That is, it is assumed that a node '@#$%' corresponding to Alias in the statement "SELECT userId, userName FROM user '@#$%' WHERE userAge >20" is an illegal node and cannot be translated into a normal Alias AST. In this case, the Alias is checked to determine that it is an optional node in a parent node, i.e., in Table. As such, Alias AST is not generated; the parent node Table includes a TableName node having a value 'user', and is still a legal AST. Other parts in the statement do not have any problem, and the generated complete AST tree may still be used to support all subsequent AST-based functions in spite of the absence of the Alias of the Table.

Optionally, the syntax units in the to-be-compiled statement further include a first clause sequence, the first clause sequence including a condition expression sequence; the first clause sequence is an optional node in the to-be-compiled statement, and the condition expression sequence is a mandatory node of the first clause sequence.

Further, optionally, when an expression condition in the condition expression sequence in the to-be-compiled statement is incorrect, step S208 of recursively querying whether the parent node is the optional node of a corresponding upper-level parent node includes the following steps:

Step1: It is queried whether the condition expression sequence is the optional node in the first clause sequence.

In Step1 in the foregoing step S208 of the present application, when an expression condition in the condition expression sequence in the to-be-compiled statement is incorrect, it is necessary to query whether the condition expression sequence is the optional node in the first clause sequence. When the query result is no, Step2 is performed.

Step2: When the query result is no, it is queried whether the first clause sequence is the optional node in the to-be-compiled statement.

Based on the query in Step1, in the foregoing Step2 of the present application, when the query result is that the condition expression sequence is not an optional node in the first clause sequence, it is necessary to query whether the first clause sequence is the optional node in the to-be-compiled statement.

Specifically, referring to FIG. 3, it is assumed that there is a to-be-compiled statement "SELECT userId, userName FROM user t WHERE user Age*20". A relational operator in a node corresponding to Condition in the statement is illegal '*' is not an acceptable relational operator and cannot be translated into a normal AST. In this case, it is checked that the corresponding parent node, i.e., the Condition, in the condition expression sequence is not an optional node, and therefore the parent node Condition cannot generate an AST either. It is queried whether the Condition is optional in the condition expression sequence WhereCondition. If the Condition is a mandatory node, the parent node of the condition expression sequence WhereCondition, i.e., the first clause sequence WhereClause is further checked to query whether the condition expression sequence WhereCondition is an optional node in the first clause sequence WhereClause. When the query result is yes, it is continuously checked whether the first clause sequence WhereClause is an optional node in the parent node SelectStatement.

Further, optionally, Step S210 of deleting the syntax unit corresponding to the parent node and compiling remaining correct syntax units in the to-be-compiled statement when the query result is yes includes the following step:

Step1: The syntax unit corresponding to the first clause sequence is deleted, and remaining correct syntax units in the to-be-compiled statement are compiled.

In Step1 in the foregoing step S210 of the present application, when the query result is that the parent node is an optional node in the corresponding parent node of the parent node, the syntax unit corresponding to the first clause sequence is deleted, and the remaining correct syntax units in the to-be-compiled statement are compiled.

Specifically, still referring to the example in Step1 and Step2 in step S208, when it is obtained through query that the first clause sequence WhereClause is an optional node, the whole part corresponding to the WhereClause is trimmed; the remaining part still may be used to generate a legal AST of the SelectStatement without the incorrect WhereClause, and still may be used to support all subsequent AST-based functions.

Referring to step S202 to step S210, the method for compiling a computer language according to the example embodiment of the present application may include three types of syntax errors specifically as follows:

1. Completely correct input source codes:

"SELECT userId, userName FROM user t WHERE userAge >20".

This statement does not have any problem and may generate a complete AST tree.

2. Error case 1: a single optional node has an error:

"SELECT userId, userName FROM user '@#$%' WHERE userAge >20".

A node '@#$%' corresponding to Alias in the statement is an illegal node and cannot be translated into a normal Alias AST. In this case, the Alias is checked to determine that it is an optional node in a parent node, i.e., in Table. As such, Alias AST is not generated. The parent node Table includes a TableName node having a value 'user', and the AST is still a legal AST. Other parts in the statement do not have any problem, and the generated complete AST tree may still be used to support all subsequent AST-based functions in spite of the absence of the Alias of the Table.

3. Error case 2: a single non-optional node has an error:

"SELECT userId, userName FROM user t WHERE userAge*20".

A relational operator in a node corresponding to Condition in the statement is illegal. '*' is not an acceptable relational operator and cannot be translated into a normal AST. In this case, it is checked that '*' is not an optional node in the parent node, i.e., in Condition. Therefore, the parent node Condition cannot generate an AST either even though other nodes of the Condition are correct. In this case, it is continuously checked whether the Condition is optional in the parent node thereof. If the Condition is optional in the parent node, the PST of this part is trimmed, and if the Condition is not optional in the parent node, it is checked recursively whether the parent node is optional in the corresponding parent node. In this example, the Condition is not optional in WhereCondition but is a mandatory item. Therefore, the parent node WhereClause of the WhereCondition is further checked, and it is found that the WhereCondition is still not an optional node in the WhereClause. The parent node SelectStatement of the WhereCondition is continuously checked, and it is found that the WhereCondition is optional in the SelectStatement. The whole part corresponding to the WhereClause is trimmed; the remaining part still may be used to generate a legal AST of the SelectStatement without the incorrect WhereClause, and still may be used to support all subsequent AST-based functions.

4. Error case 3: one or more optional loop nodes have errors:

"SELECT userId, user@#ame, userAge, &usexxx FROM user t WHERE user Age >20".

In the AST, Column1 . . . ColumnN together form a Select list, and any of the columns is optional. However, the final list should have at least one of the columns. In the exemplary statement, illegal characters exist in nodes corresponding to Column2 and Column4, and cannot be translated into an AST of the Column. In this case, the parent node, i.e., the SelectList is checked to determine whether there is another legal Condition. It is found that Column1 and Column3 are correct, and hence the incorrect Column2 and Column4 are trimmed. Correct SelectList nodes corresponding to the Column1 and the Column 3 may still be included. Finally, a legal SelectStatement may still be generated without the two incorrect Columns, and may still be used to support all subsequent AST-based functions. In this example, if all Columns have errors, according to rules in this example and example 3, the whole SelectStatement cannot be generated correctly. However, this is an expected result because a Select statement without the select list is illegal.

In view of the above, the method for compiling a computer language according to the example embodiment of the present application may be applied to a complier for an SQL language, and may also be applied to any other computer language. The method for compiling a computer language according to the example embodiment of the present application may determine recursively whether an AST is optional in its parent node, thus implementing error-tolerant analysis on the computer language, reducing the work load during compiling, and achieving correct compiling of the computer language to the maximum extent.

It should be noted that for ease of description, the method example embodiments mentioned above are all described as a series of action combinations. However, persons skilled in the art should know that the present disclosure is not limited to the action order described because some steps may be performed in other orders or simultaneously according to the present disclosure. Secondly, persons skilled in the art should also know that the example embodiments described in the specification are example embodiments, and actions and modules involved are not necessarily mandatory for the present disclosure.

Based on the foregoing descriptions of the implementation manners, those skilled in the art may clearly understand that the method for compiling a computer language according to the above example embodiment may be implemented by software plus a necessary hardware platform, and certainly may also be implemented by hardware. Based on such an understanding, the technical solutions of the present disclosure essentially, or the part contributing to the conventional techniques, may be embodied in the form of a software product. The computer software product may be stored in a storage medium (such as a Read-Only Memory (ROM)/Random Access Memory (RAM), a magnetic disk, or an optical disc), and includes several instructions for instructing a terminal device (which may be a mobile terminal, a computer, a server, a network device, or the like) to perform the methods in the example embodiments of the present disclosure.

Example Embodiment 2

According to the example embodiments of the present disclosure, an apparatus example embodiment for implementing the foregoing method example embodiment is further provided. The apparatus provided in the foregoing example embodiment of the present application may run on a computer terminal.

Figure 7:
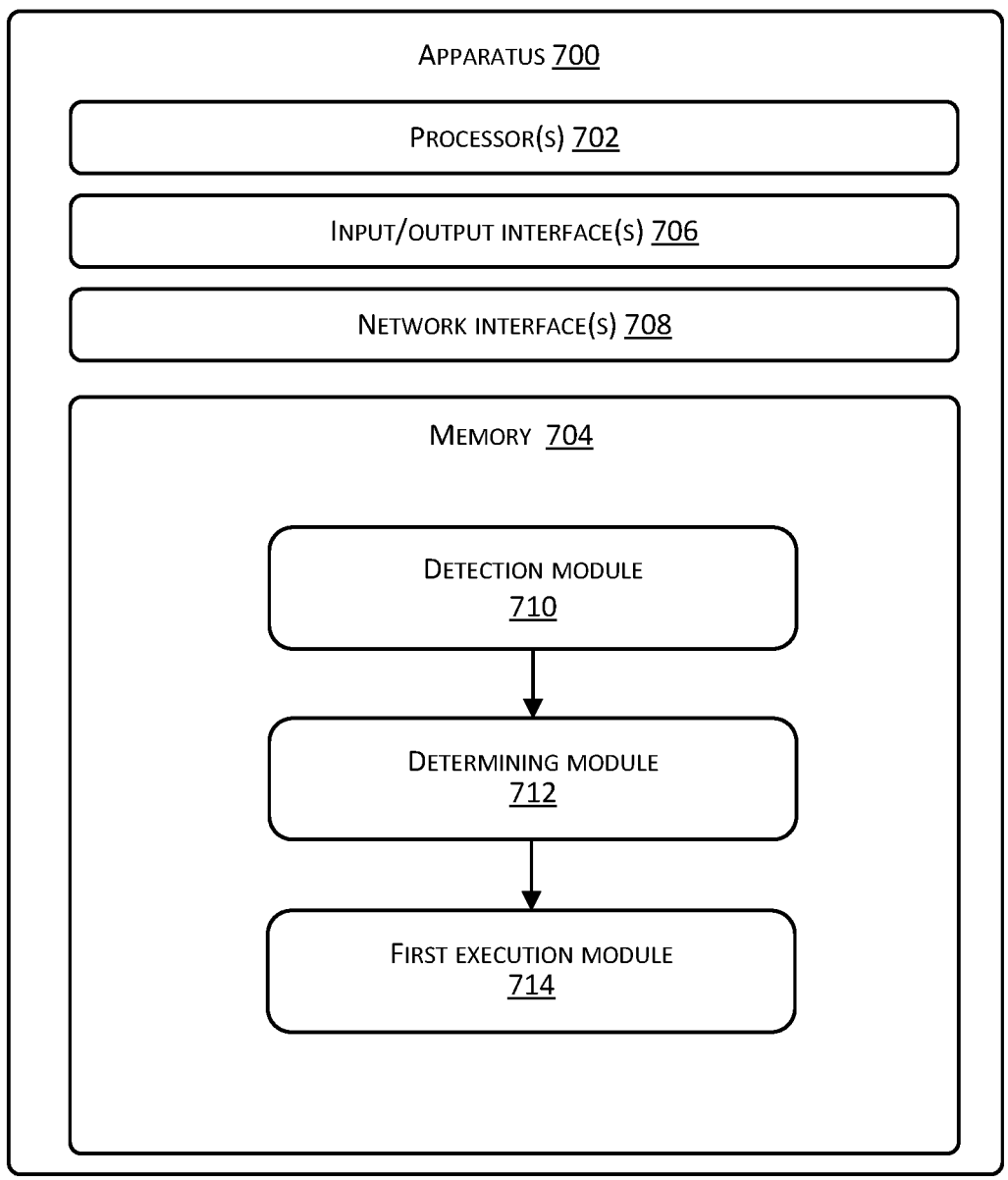
FIG. 7 is a schematic structural diagram of an apparatus for compiling a computer language according to Example embodiment 2 of the present disclosure.

FIG. 7 is a schematic structural diagram of an apparatus 700 for compiling a computer language according to Example embodiment 2 of the present disclosure.

As shown in FIG. 7, the apparatus 700 includes one or more processor(s) 702 or data processing unit(s) and memory 704. The apparatus 700 may further include one or more input/output interface(s) 706 and one or more network interface(s) 708.

The memory 704 is an example of computer readable medium. The memory 704 may store therein a plurality of modules or units including a detection module 710, a determining module 712, and a first execution module 714.

The detection module 710 is configured to detect, according to a preset syntax, whether an incorrect syntax unit exists in a to-be-compiled statement. The determining module 712 is configured to: when the detection result is yes, determine whether a child node at which the syntax unit is located is an optional node of a corresponding parent node. The first execution unit 73 is configured to: when the determination result is yes, delete the syntax unit.

As may be seen, in the solution provided in Example embodiment 2 of the present disclosure, it is detected according to a preset syntax whether an incorrect syntax unit exists in a to-be-compiled statement; when the detection result is yes, it is determined whether a child node at which the syntax unit is located is an optional node of a corresponding parent node; and when the determination result is yes, the syntax unit is deleted. Therefore, the objective of improving the success rate of compiling when there are a lot of errors in the computer language is achieved, thus achieving the technical effect of improving the compiling efficiency, and further addressing the problem of low computer language compiling efficiency caused by the lack of a fault-tolerant computer language compiling technology in the conventional techniques.

Here, it should be noted that the detection module 710, the determining module 712, and the first execution module 714 correspond to step S202 to step S206 in Example embodiment 1. Examples and application scenarios implemented by the three modules and the corresponding steps are the same, and are not limited to the content disclosed in Example embodiment 1. It should be noted that the modules may run in the computer terminal 10 provided in Example embodiment 1 as a part of the apparatus, and may be implemented by software or hardware.

Figure 8:
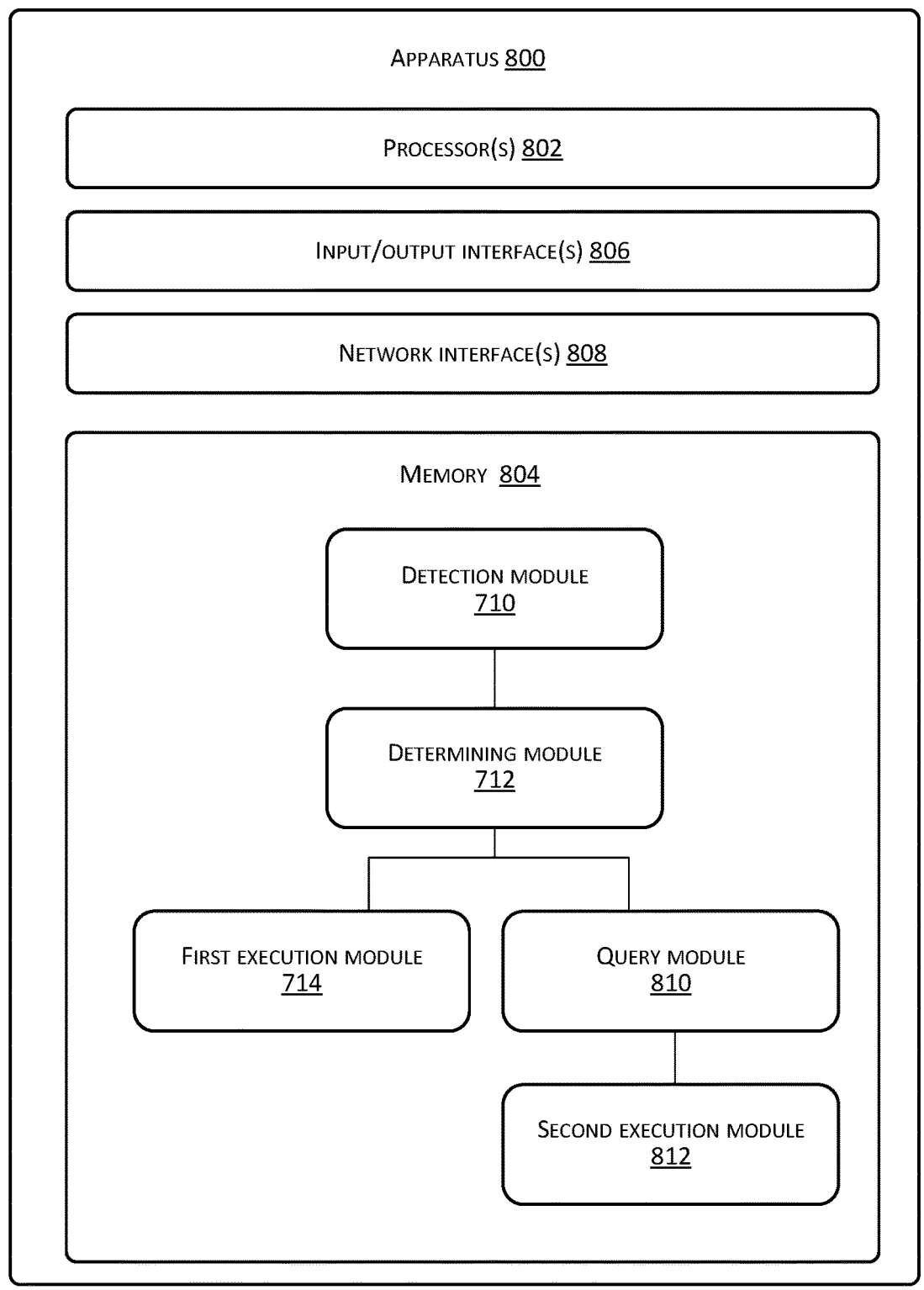
FIG. 8 is a schematic structural diagram of an apparatus for compiling a computer language according to Example embodiment 2 of the present disclosure.

Optionally, FIG. 8 is a schematic structural diagram of an apparatus 800 for compiling a computer language according to Example embodiment 2 of the present disclosure. As shown in FIG. 8, the apparatus 800 includes one or more processor(s) 802 or data processing unit(s) and memory 804. The apparatus 800 may further include one or more input/output interface(s) 806 and one or more network interface(s) 808.

The memory 804 is an example of computer readable medium. The memory 804 may store therein a plurality of modules or units including a detection module 710, a determining module 712, and a first execution module 714, a query module 810 and a second execution module 812.

The query module 810 is configured to: when the determination result of determining whether a child node at which the syntax unit is located is an optional node of a corresponding parent node is no, recursively query whether the parent node is the optional node of a corresponding upper-level parent node. The second execution module 812 is configured to: when the query result is yes, delete the syntax unit corresponding to the parent node, and compile remaining correct syntax units in the to-be-compiled statement.

Here, it should be noted that the query module 810 and the second execution module 812 correspond to step S208 to step S210 in Example embodiment 1, and examples and application scenarios implemented by the two modules and the corresponding steps are the same, and are not limited to the content disclosed in Example embodiment 1. It should be noted that the modules may run in the computer terminal 10 provided in Example embodiment 1 as a part of the apparatus, and may be implemented by software or hardware.

Optionally, the syntax units in the to-be-compiled statement include: a select clause sequence and a source clause sequence, wherein the select clause sequence includes a select list, any column in the select list being the optional node in the select list; and the source clause sequence includes a source table name and/or a source alias, the source alias being the optional node in the source clause sequence.

Figure 9:
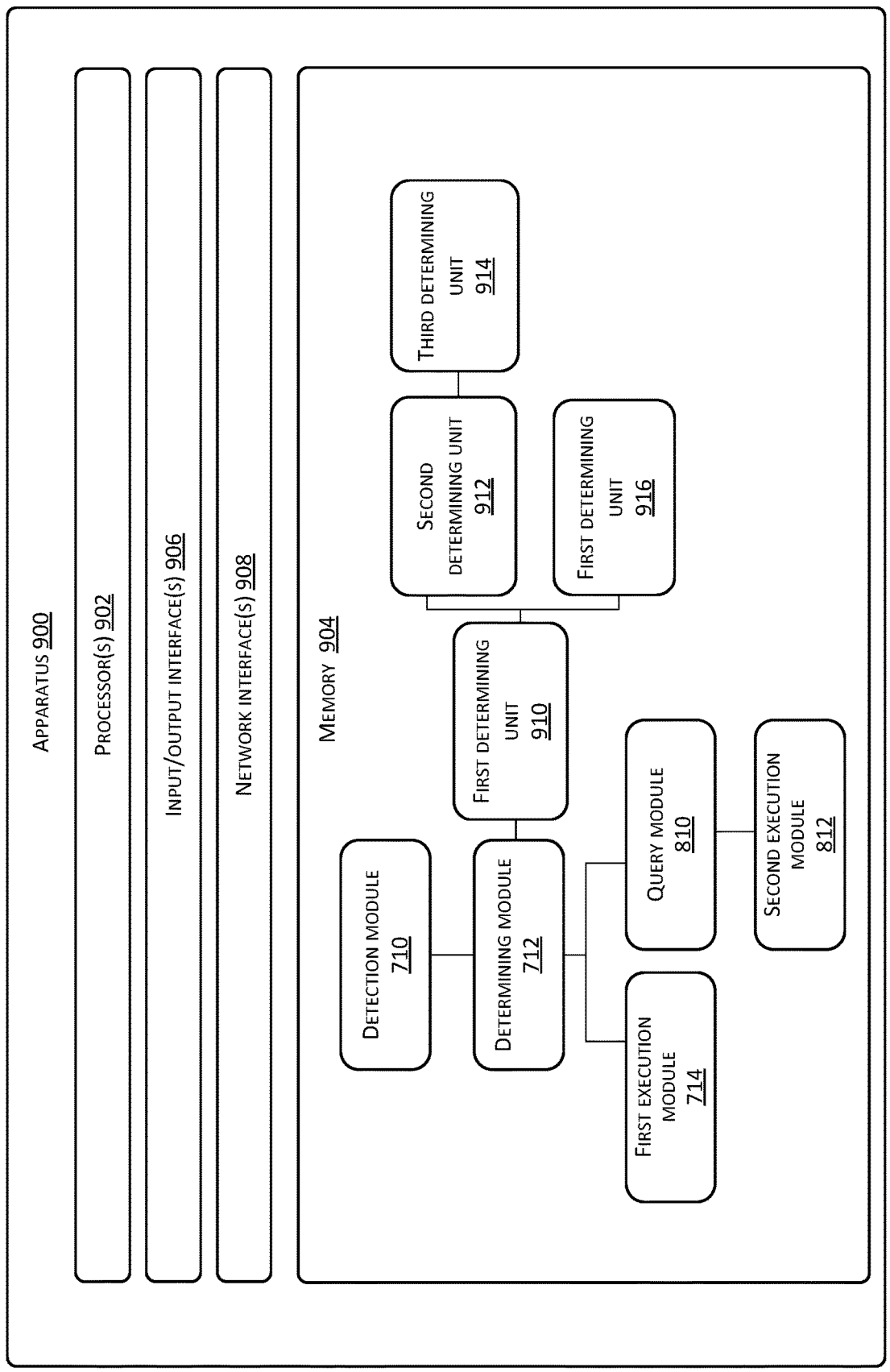
FIG. 9 is a schematic structural diagram of another apparatus for compiling a computer language according to Example embodiment 2 of the present disclosure.

Optionally, FIG. 9 is a schematic structural diagram of another apparatus 900 for compiling a computer language according to Example embodiment 2 of the present disclosure. As shown in FIG. 9, the apparatus 900 includes one or more processor(s) 902 or data processing unit(s) and memory 904. The apparatus 900 may further include one or more input/output interface(s) 906 and one or more network interface(s) 908.

The memory 904 is an example of computer readable medium. The memory 904 may store therein a plurality of modules or units including a detection module 710, a determining module 712, and a first execution module 714, a query module 810 and a second execution module 812.

The determining module 712 includes: a first determining unit 910, a second determining unit 912, a third determining unit 914, and a fourth determining unit 916.

The first determining unit 910 is configured to: when the incorrect syntax unit is the select list in the select clause sequence, determine whether each column in the select list has a syntax error. The second determining unit 912 is configured to: when the determination result is no, determine whether at least one column in the select list has a syntax error. The third determining unit 914 is configured to: when the determination result is that at least one column in the select list has a syntax error, determine whether the select list is the optional node in the select clause sequence. The fourth determining unit 916 is configured to: when the determination result is that each column in the select list has a syntax error, determine that the to-be-compiled statement is an illegal statement.

Here, it should be noted that the first determining unit 910, the second determining unit 912, the third determining unit 914, and the fourth determining unit 916 correspond to Step1 to Step4 in step S204 of Example embodiment 1. Examples and application scenarios implemented by the four modules and the corresponding steps are the same, and are not limited to the content disclosed in Example embodiment 1. It should be noted that the modules may run in the computer terminal 100 provided in Example embodiment 1 as a part of the apparatus, and may be implemented by software or hardware.

Figure 10:
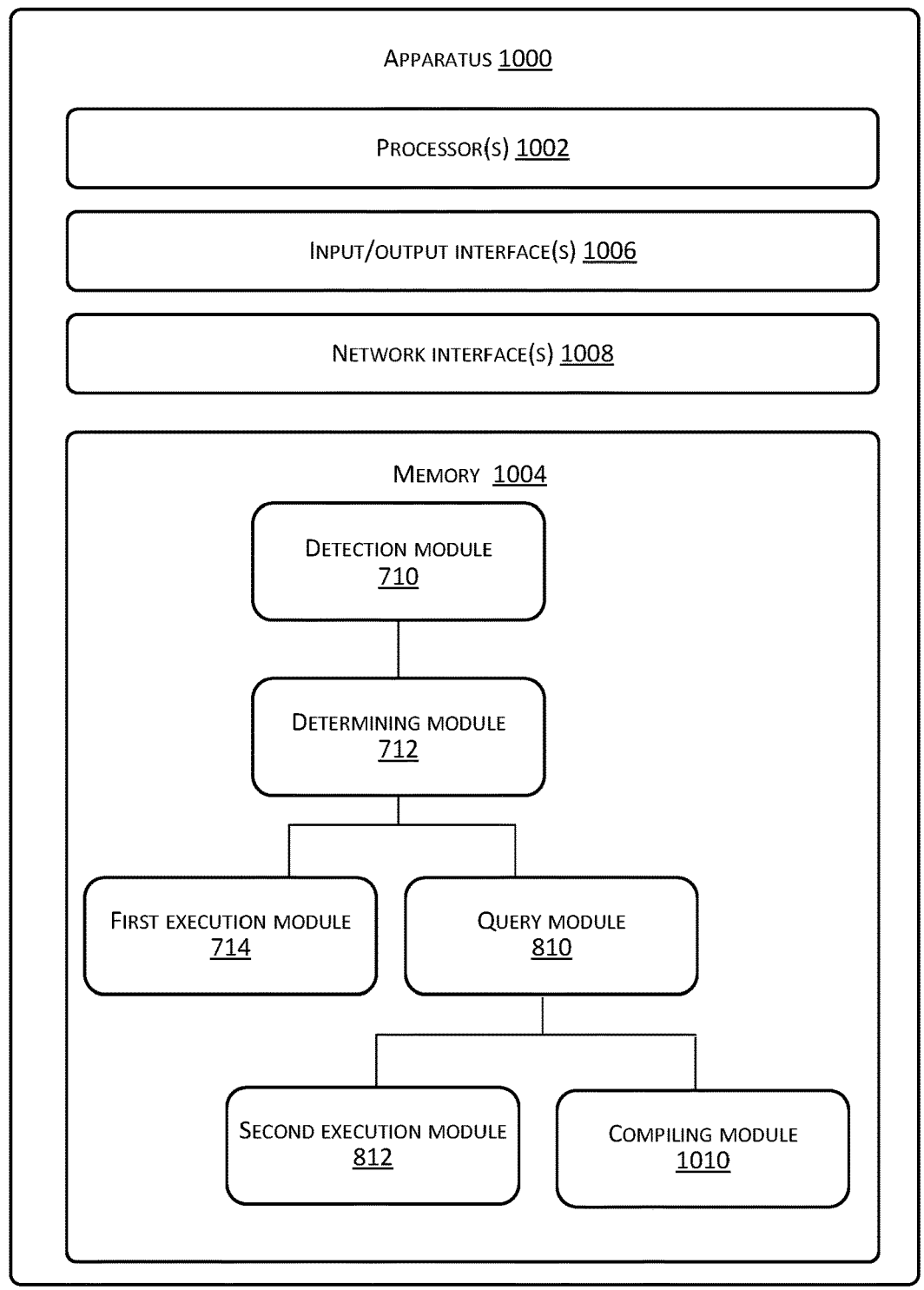
FIG. 10 is a schematic structural diagram of still another apparatus for compiling a computer language according to Example embodiment 2 of the present disclosure.

Optionally, FIG. 10 is a schematic structural diagram of still another apparatus 1000 for compiling a computer language according to Example embodiment 2 of the present disclosure. As shown in FIG. 10, the apparatus 1000 includes one or more processor(s) 1002 or data processing unit(s) and memory 1004. The apparatus 1000 may further include one or more input/output interface(s) 1006 and one or more network interface(s) 1008.

The memory 1004 is an example of computer readable medium. The memory 1004 may store therein a plurality of modules or units including a detection module 710, a determining module 712, and a first execution module 714, a query module 810, a second execution module 812, and a compiling module 1010.

The compiling module 1010 is configured to: after it is recursively queried whether the parent node is the optional node of a corresponding upper-level parent node, compile columns with correct syntax in the select list when the query result is that the select list is a mandatory node in the select clause sequence.

Here, it should be noted that the compiling module 1010 corresponds to step S209 in Example embodiment 1. Examples and application scenarios implemented by the module and the corresponding step are the same, and are not limited to the content disclosed in Example embodiment 1. It should be noted that the module may run in the computer terminal 100 provided in Example embodiment 1 as a part of the apparatus, and may be implemented by software or hardware.

Optionally, the determining module 712 includes a fifth determining unit.

The fifth determining unit is configured to: when the incorrect syntax unit is the source alias in the source clause sequence, determine whether the source alias is the optional node in the source clause sequence.

Here, it should be noted that the fifth determining unit corresponds to Step1 in step S204 of Example embodiment 1. Examples and application scenarios implemented by the module and the corresponding step are the same, and are not limited to the content disclosed in Example embodiment 1. It should be noted that the module may run in the computer terminal 100 provided in Example embodiment 1 as a part of the apparatus, and may be implemented by software or hardware.

Figure 11:
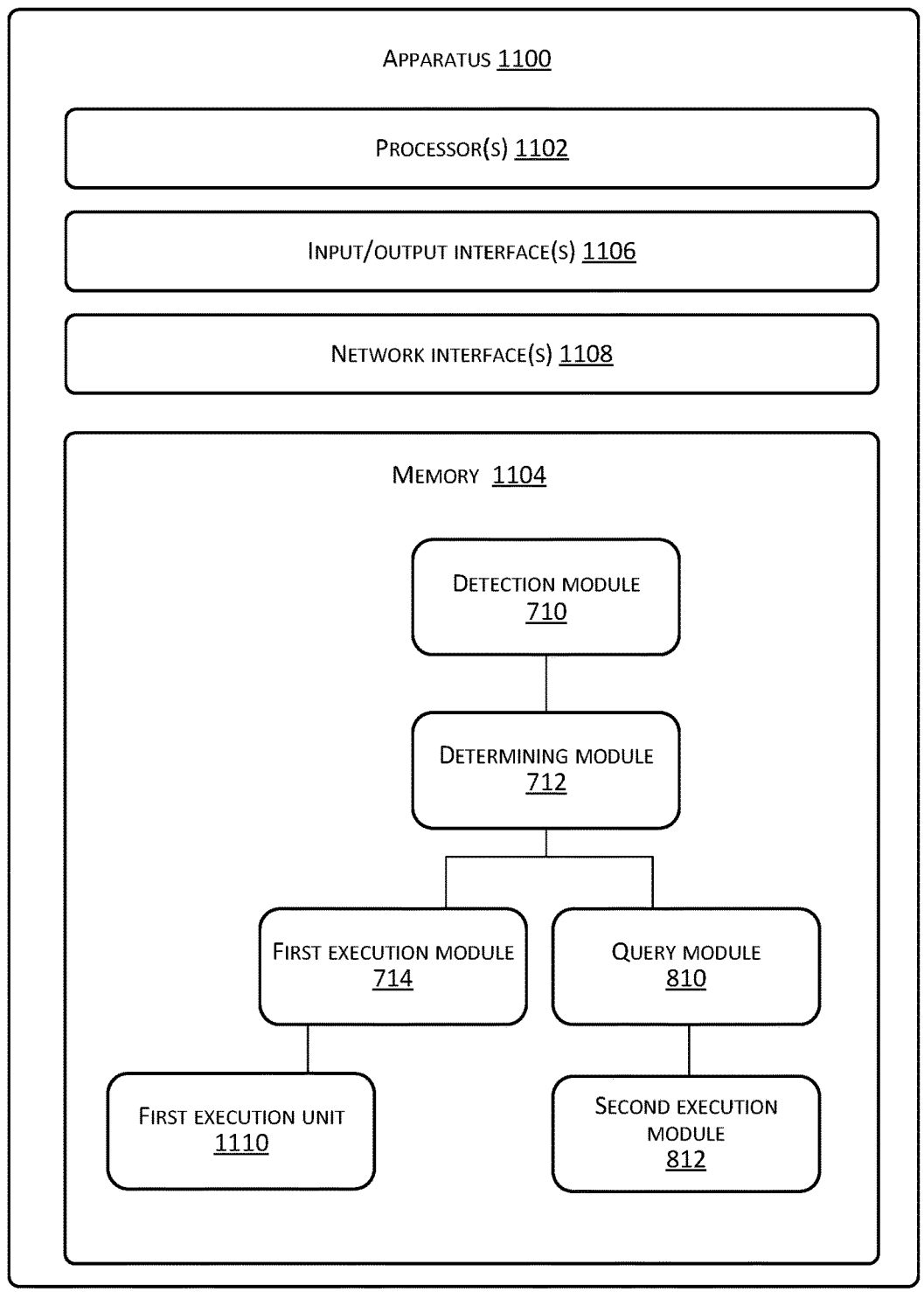
FIG. 11 is a schematic structural diagram of yet another apparatus for compiling a computer language according to Example embodiment 2 of the present disclosure.

Optionally, FIG. 11 is a schematic structural diagram of yet another apparatus 1100 for compiling a computer language according to Example embodiment 2 of the present disclosure. As shown in FIG. 11, the apparatus 1100 includes one or more processor(s) 1102 or data processing unit(s) and memory 1104. The apparatus 1100 may further include one or more input/output interface(s) 1106 and one or more network interface(s) 1108.

The memory 1104 is an example of computer readable medium. The memory 1104 may store therein a plurality of modules or units including a detection module 710, a determining module 712, and a first execution module 714, a query module 810, and a second execution module 812. The first execution module 714 includes a first execution unit 1110.

The first execution unit 1110 is configured to: when the determination result is that the source alias is the optional node in the source clause sequence, delete the syntax unit corresponding to the source alias, and compile remaining correct syntax units in the to-be-compiled statement.

Here, it should be noted that the first execution unit 1110 corresponds to Step1 in step S206 of Example embodiment 1. Examples and application scenarios implemented by the module and the corresponding step are the same, and are not limited to the content disclosed in Example embodiment 1. It should be noted that the module may run in the computer terminal 100 provided in Example embodiment 1 as a part of the apparatus, and may be implemented by software or hardware.

Optionally, the syntax units in the to-be-compiled statement further include a first clause sequence, the first clause sequence including a condition expression sequence; the first clause sequence is an optional node in the to-be-compiled statement, and the condition expression sequence is a mandatory node of the first clause sequence.

Optionally, the query module 810 includes: a first query unit and a second query unit (both not shown in the FIGs).

The first query unit is configured to: when an expression condition in the condition expression sequence in the to-be-compiled statement is incorrect, query whether the condition expression sequence is the optional node in the first clause sequence. The second query unit is configured to: when the query result is no, query whether the first clause sequence is the optional node in the to-be-compiled statement.

Here, it should be noted that the first query unit and the second query unit correspond to Step 1 and Step 2 in step S208 of Example embodiment 1. Examples and application scenarios implemented by the two modules and the corresponding steps are the same, and are not limited to the content disclosed in Example embodiment 1. It should be noted that the modules may run in the computer terminal 100 provided in Example embodiment 1 as a part of the apparatus, and may be implemented by software or hardware.

Figure 12:
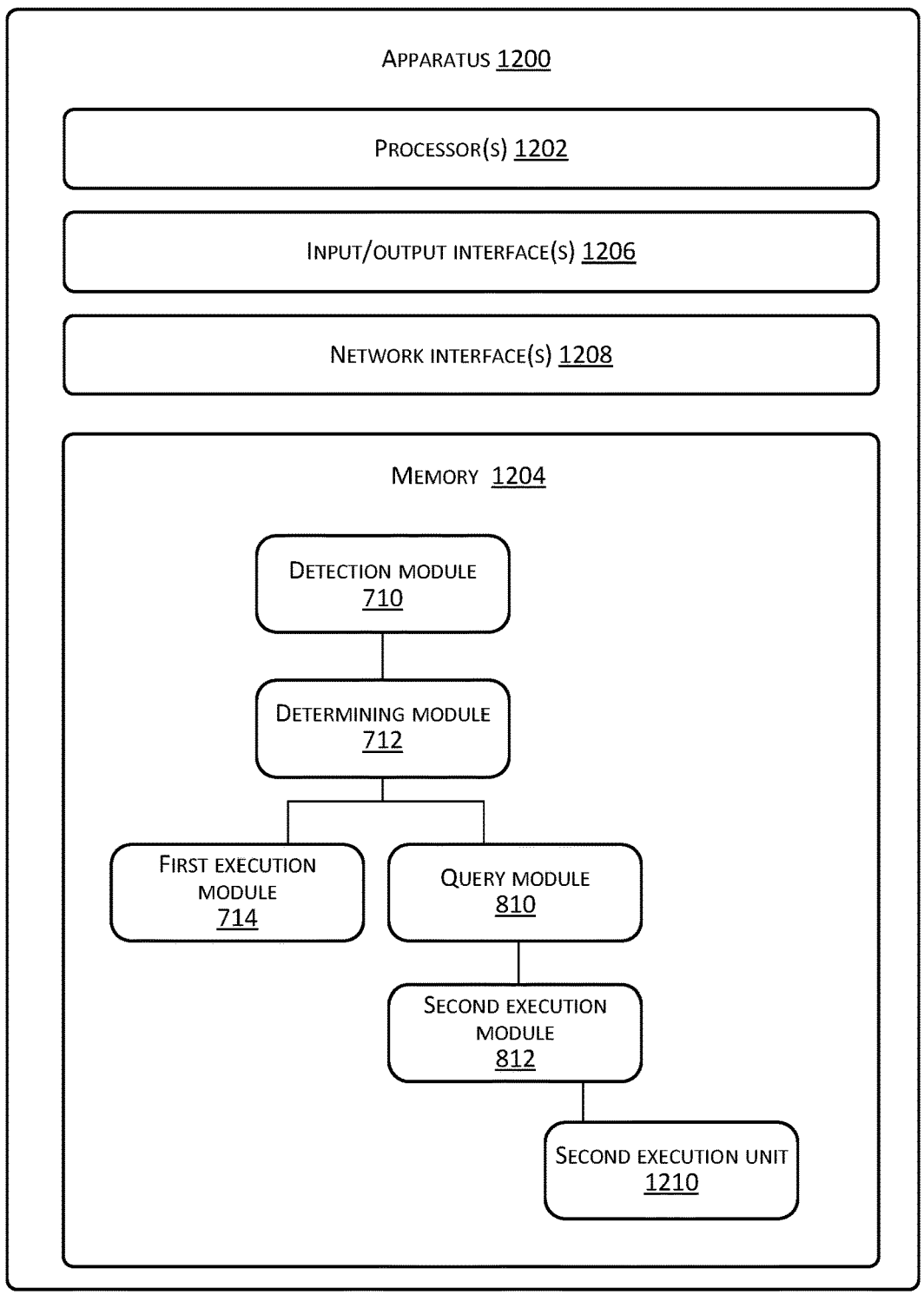
FIG. 12 is a schematic structural diagram of a second execution module in an apparatus for compiling a computer language according to Example embodiment 2 of the present disclosure.

Further, optionally, FIG. 12 is a schematic structural diagram of an apparatus 1200 for compiling a computer language according to Example embodiment 2 of the present disclosure. As shown in FIG. 12, the apparatus 1200 includes one or more processor(s) 1202 or data processing unit(s) and memory 1204. The apparatus 1200 may further include one or more input/output interface(s) 1206 and one or more network interface(s) 1208.

The memory 1204 is an example of computer readable medium. The memory 1204 may store therein a plurality of modules or units including a detection module 710, a determining module 712, and a first execution module 714, a query module 810, and a second execution module 812. The second execution module 812 includes a second execution unit 1210.

The second execution unit 1210 is configured to delete the syntax unit corresponding to the first clause sequence and compile remaining correct syntax units in the to-be-compiled statement.

Here, it should be noted that the second execution unit 1210 corresponds to Step1 in step S210 of Example embodiment 1. Examples and application scenarios implemented by the module and the corresponding step are the same, and are not limited to the content disclosed in Example embodiment 1. It should be noted that the module may run in the computer terminal 100 provided in Example embodiment 1 as a part of the apparatus, and may be implemented by software or hardware.

In view of the above, the method for compiling a computer language according to the example embodiment of the present application may be applied to a complier for an SQL language, and may also be applied to any other computer language. The method for compiling a computer language according to the example embodiment of the present application may determine recursively whether an AST is optional in its parent node, thus implementing error-tolerant analysis on the computer language, reducing the work load during compiling, and achieving correct compiling of the computer language to the maximum extent.

Example Embodiment 3

An example embodiment of the present disclosure further provides a computer storage medium. Optionally, in this example embodiment, the storage medium may be configured to store program codes executed by the method for compiling a computer language provided in Example embodiment 1.

Optionally, in this example embodiment, the storage medium may be located in any computer terminal in a computer terminal group in a computer network, or located in any mobile terminal in a mobile terminal group.

Optionally, in this example embodiment, the storage medium is configured to store program codes for performing the following steps: detecting, according to a preset syntax, whether an incorrect syntax unit exists in a to-be-compiled statement; when the detection result is yes, determining whether a child node at which the syntax unit is located is an optional node of a corresponding parent node; and when the determination result is yes, deleting the syntax unit.

Optionally, in this example embodiment, the storage medium is configured to store program codes for performing the following steps: when the determination result is no, recursively querying whether the parent node is the optional node of a corresponding upper-level parent node; and when the query result is yes, deleting the syntax unit corresponding to the parent node, and compiling remaining correct syntax units in the to-be-compiled statement.

Optionally, in this example embodiment, the storage medium is configured to store program codes for performing the following step: the syntax units in the to-be-compiled statement includes a select clause sequence and a source clause sequence, wherein the select clause sequence includes a select list, any column in the select list being the optional node in the select list; and the source clause sequence includes a source table name and/or a source alias, the source alias being the optional node in the source clause sequence.

Optionally, in this example embodiment, the storage medium is configured to store program codes for performing the following steps: determining whether each column in the select list has a syntax error; and when the determination result is no, determining whether at least one column in the select list has a syntax error; and when the determination result is that at least one column in the select list has a syntax error, determining whether the select list is the optional node in the select clause sequence; or when the determination result is that each column in the select list has a syntax error, determining that the to-be-compiled statement is an illegal statement.

Optionally, in this example embodiment, the storage medium is configured to store program codes for performing the following step: when the query result is that the select list is a mandatory node in the select clause sequence, compiling columns with correct syntax in the select list.

Optionally, in this example embodiment, the storage medium is configured to store program codes for performing the following step: determining whether the source alias is the optional node in the source clause sequence.

Optionally, in this example embodiment, the storage medium is configured to store program codes for performing the following step: when the determination result is that the source alias is the optional node in the source clause sequence, deleting the syntax unit corresponding to the source alias, and compiling remaining correct syntax units in the to-be-compiled statement.

Optionally, in this example embodiment, the storage medium is configured to store program codes for performing the following steps: querying whether the condition expression sequence is the optional node in the first clause sequence; and when the query result is no, querying whether the first clause sequence is the optional node in the to-be-compiled statement.

Optionally, in this example embodiment, the storage medium is configured to store program codes for performing the following step: deleting the syntax unit corresponding to the first clause sequence and compiling remaining correct syntax units in the to-be-compiled statement.

The serial numbers of the example embodiments of the present disclosure are merely used for description, and do not imply the preference among the example embodiments.

In the above example embodiments, the descriptions on the example embodiments have respective emphases. For parts that are not described in detail in an example embodiment, reference may be made to related descriptions in other example embodiments.

In the several example embodiments provided in the present application, it should be understood that the disclosed technical content may be implemented in other manners. For example, the apparatus example embodiment described in the foregoing is merely schematic. For example, the division of units is merely division of logic functions, and in fact, there may be other division manners during actual implementation. For example, a plurality of units or components may be combined or may be integrated into another system, or some features may be ignored or not be performed. On the other hand, the shown or discussed mutual coupling or direct coupling or communication connection may be implemented by using some interfaces, and indirect coupling or communication connection between units or modules may be in an electrical form or other forms.

The units described as separated parts may be or may not be physically separated, parts shown as units may be or may not be physical units, and they may be located at the same place or distributed to a plurality of network units. The objective of the solution of this example embodiment may be implemented by selecting a part of or all of the units according to actual requirements.

In addition, various function units in the example embodiments of the present disclosure may be integrated in one processing unit, or each unit may exist as a separate physical presence, or two or more units may also be integrated in one unit. The integrated unit may be implemented in the form of hardware, and may also be implemented in the form of a software functional unit.

If implemented in the form of a software functional unit and sold or used as an independent product, the integrated unit may be stored in a computer readable storage medium. Based on such an understanding, the technical solutions of the present disclosure essentially, or the part contributing to the conventional techniques, or all or a part of the technical solution may be implemented in the form of a software product. The computer software product may be stored in a storage medium, and includes several instructions for instructing a computer device (which may be a personal computer, a server, or a network device) to execute all or a part of steps in the methods described in the example embodiments of the present disclosure. The storage medium includes: a USB flash disk, a Read-Only Memory (ROM), a Random Access Memory (RAM), a mobile hard disk, a magnetic disk, an optical disc, or other mediums that may store program codes.

It should be noted that, persons of ordinary skill in the art may further obtain variations and improvements without departing from the principle of the present disclosure. The variations and improvements should also be considered as the protection scope of the present disclosure.

The present disclosure may further be understood with clauses as follows.

Clause 1. A method for compiling a computer language, the method comprising:

detecting, according to a preset syntax, whether an incorrect syntax unit exists in a to-be-compiled statement;

determining whether a child node at which the syntax unit is located is an optional node of a corresponding parent node, in response to determining that the incorrect syntax unit exists in the to-be compiled statement; and deleting the syntax unit, in response to determining that the child node at which the syntax unit is located is the optional node of the corresponding parent node.

Clause 2. The method of clause 1, wherein after the determining whether the child node at which the syntax unit is located is the optional node of the corresponding parent node, the method further comprises:

recursively querying whether the parent node is the optional node of a corresponding upper-level parent node, in response to determining that the child node at which the syntax unit is located is not the optional node of the corresponding parent node; and deleting the syntax unit corresponding to the parent node and compiling remaining correct syntax units in the to-be-compiled statement, in response to determining that the parent node is the optional node of the corresponding upper-level parent node.

Clause 3. The method of clause 2, wherein syntax units in the to-be-compiled statement comprise:

a select clause sequence; and a source clause sequence, wherein:

the select clause sequence comprises:

a select list, any column in the select list being the optional node in the select list; and the source clause sequence comprises:

a source table name and/or a source alias, the source alias being the optional node in the source clause sequence.

Clause 4. The method of clause 3, wherein when the incorrect syntax unit is the select list in the select clause sequence, the determining whether the child node at which the syntax unit is located is the optional node of the corresponding parent node comprises:

determining whether each column in the select list has a syntax error;

determining whether at least one column in the select list has the syntax error, in response to determining that not each column in the select list has the syntax error;

determining whether the select list is the optional node in the select clause sequence, in response to determining that at least one column in the select list has the syntax error; and determining that the to-be-compiled statement is an illegal statement, in response to determining that each column in the select list has the syntax error.

Clause 5. The method of clause 4, wherein after the recursively querying whether the parent node is the optional node of the corresponding upper-level parent node, the method further comprises:

compiling a column with correct syntax in the select list, in response to determining that a query result is that the select list is a mandatory node in the select clause sequence.

Clause 6. The method of clause 3, wherein when the incorrect syntax unit is the source alias in the source clause sequence, the determining whether the child node at which the syntax unit is located is the optional node of the corresponding parent node comprises:

determining whether the source alias is the optional node in the source clause sequence.

Clause 7. The method of clause 6, wherein when the source alias is the optional node in the source clause sequence, the deleting the syntax unit comprises:

in response to determining that the source alias is the optional node in the source clause sequence, deleting the syntax unit corresponding to the source alias; and compiling remaining correct syntax units in the to-be-compiled statement.

Clause 8. The method of clause 3, wherein the syntax units in the to-be-compiled statement further comprise a first clause sequence, the first clause sequence comprising a condition expression sequence, the first clause sequence being the optional node in the to-be-compiled statement, and the condition expression sequence being the mandatory node of the first clause sequence.

Clause 9. The method of clause 8, wherein when an expression condition in the condition expression sequence in the to-be-compiled statement is incorrect, the recursively querying whether the parent node is the optional node of the corresponding upper-level parent node comprises:

querying whether the condition expression sequence is the optional node in the first clause sequence; and querying whether the first clause sequence is the optional node in the to-be-compiled statement, in response to determining that the condition expression sequence is not the optional node in the first clause sequence.

Clause 10. The method of clause 9, wherein the deleting the syntax unit corresponding to the parent node and compiling the remaining correct syntax units in the to-be-compiled statement comprises:

deleting the syntax unit corresponding to the first clause sequence; and compiling the remaining correct syntax units in the to-be-compiled statement.

Clause 11. An apparatus for compiling a computer language, comprising:

a detection module configured to detect, according to a preset syntax, whether an incorrect syntax unit exists in a to-be-compiled statement;

a determining module configured to determine whether a child node at which the syntax unit is located is an optional node of a corresponding parent node, in response to determining that the incorrect syntax unit exists in the to-be compiled statement; and a first execution module configured to delete the syntax unit, in response to determining that the child node at which the syntax unit is located is the optional node of the corresponding parent node.

Clause 12. The apparatus of clause 11, wherein the apparatus further comprises:

a query module configured to recursively querying whether the parent node is the optional node of a corresponding upper-level parent node, in response to determining that the child node at which the syntax unit is located is not the optional node of the corresponding parent node; and a second execution module configured to delete the syntax unit corresponding to the parent node and compile remaining correct syntax units in the to-be-compiled statement, in response to determining that the parent node is the optional node of the corresponding upper-level parent node Clause 13. The apparatus of clause 12, wherein syntax units in the to-be-compiled statement comprise:

a select clause sequence; and a source clause sequence, wherein:

the select clause sequence comprises:

a select list, any column in the select list being the optional node in the select list; and the source clause sequence comprises:

a source table name and/or a source alias, the source alias being the optional node in the source clause sequence.

Clause 14. The apparatus of clause 13, wherein the determining module comprises:

a first determining unit configured to determine whether each column in the select list has a syntax error, in response to determining that the incorrect syntax unit is the select list in the select clause sequence;

a second determining unit configured to determine whether at least one column in the select list has the syntax error, in response to determining that not each column in the select list has the syntax error;

a third determining unit configured to determine whether the select list is the optional node in the select clause sequence, in response to determining that at least one column in the select list has the syntax error; and a fourth determining unit configured to determine that the to-be-compiled statement is an illegal statement, in response to determining that each column in the select list has the syntax error.

Clause 15. The apparatus of clause 14, further comprising:

a compiling module configured to, after the recursively querying whether the parent node is the optional node of the corresponding upper-level parent node, compile a column with correct syntax in the select list, in response to determining that a query result is that the select list is a mandatory node in the select clause sequence.

Clause 16. The apparatus of clause 13, wherein the determining module comprises:

a fifth determining unit configured to, when the incorrect syntax unit is the source alias in the source clause sequence, determine whether the source alias is the optional node in the source clause sequence.

Clause 17. The apparatus of clause 16, wherein the first execution module comprises:

a first execution unit configured to, when the source alias is the optional node in the source clause sequence, delete the syntax unit corresponding to the source alias and compile remaining correct syntax units in the to-be-compiled statement.

Clause 18. The apparatus of clause 13, wherein the syntax units in the to-be-compiled statement further comprise a first clause sequence, the first clause sequence comprising a condition expression sequence, the first clause sequence being the optional node in the to-be-compiled statement, and the condition expression sequence being the mandatory node of the first clause sequence.

Clause 19. The apparatus of clause 18, wherein the query module comprises:

a first query unit configured to: when an expression condition in the condition expression sequence in the to-be-compiled statement is incorrect, query whether the condition expression sequence is the optional node in the first clause sequence; and a second query unit configured to querying whether the first clause sequence is the optional node in the to-be-compiled statement, in response to determining that the condition expression sequence is not the optional node in the first clause sequence.

Clause 20. The apparatus of clause 19, wherein the second execution module comprises:

a second execution unit configured to delete the syntax unit corresponding to the first clause sequence and compile remaining correct syntax units in the to-be-compiled statement.

What is claimed is:

1. A method comprising:

detecting, according to a preset syntax, that a syntax unit of a plurality of syntax units that has a syntax error exists in a to-be-compiled statement, the preset syntax indicating one or more optional nodes that are labeled as optional;

determining that a child node at which the syntax unit is located is an optional node of a corresponding parent node, the child node including a statement with the syntax error;

deleting the syntax unit; and compiling remaining correct syntax units in the to-be-compiled statement.

2. The method of claim 1, wherein the to-be-compiled statement comprise multiple syntax units including:

a select clause sequence; and a source clause sequence, wherein:

the select clause sequence comprises:

a select list, a column in the select list acting as the optional node in the select list; and the source clause sequence comprises:

a source table name or a source alias, the source alias acting as the optional node in the source clause sequence.

3. The method of claim 2, wherein when the syntax unit is the select list in the select clause sequence, the determining that the child node at which the syntax unit is located is the optional node of the corresponding parent node comprises:

determining that each column in the select list has the syntax error; and determining that the to-be-compiled statement is an illegal statement.

4. The method of claim 2, wherein when the syntax unit is the select list in the select clause sequence, the determining that the child node at which the syntax unit is located is the optional node of the corresponding parent node comprises:

determining that not each column in the select list has the syntax error;

determining that at least one column in the select list has the syntax error; and;

determining that the select list is the optional node in the select clause sequence.

5. The method of claim 3, wherein when the syntax unit is the source alias in the source clause sequence, the determining that the child node at which the syntax unit is located is the optional node of the corresponding parent node comprises:
   determining that the source alias is the optional node in the source clause sequence.

6. The method of claim 5, wherein the deleting the syntax unit comprises:
   deleting the syntax unit corresponding to the source alias; and
   compiling remaining correct syntax units in the to-be-compiled statement.

7. The method of claim 2, wherein the multiple syntax units further include a first clause sequence, the first clause sequence comprising a condition expression sequence, the first clause sequence acting as the optional node in the to-be-compiled statement, and the condition expression sequence acting as the mandatory node of the first clause sequence.

8. A method comprising:
   detecting, according to a preset syntax, that a syntax unit that has a syntax error exists in a to-be-compiled statement, the preset syntax indicating one or more optional nodes that are labeled as optional;
   determining that a child node at which the syntax unit is located is not an optional node of a corresponding parent node, the child node including a statement with the syntax error;
   recursively querying whether the parent node is the optional node of a corresponding upper-level parent node; and
   deleting the syntax unit corresponding to the parent node and compiling remaining correct syntax units in the to-be-compiled statement, in response to determining that the parent node is the optional node of the corresponding upper-level parent node.

9. The method of claim 8, wherein the to-be-compiled statement comprise multiple syntax units including:
   a select clause sequence; and
   a source clause sequence,
   wherein:
   the select clause sequence comprises:
   a select list, a column in the select list acting as the optional node in the select list; and
   the source clause sequence comprises:
   a source table name or a source alias, the source alias acting as the optional node in the source clause sequence.

10. The method of claim 9, wherein after the recursively querying whether the parent node is the optional node of the corresponding upper-level parent node, the method further comprises:
    compiling a column with correct syntax in the select list, in response to determining that a query result is that the select list is a mandatory node in the select clause sequence.

11. The method of claim 9, wherein the multiple syntax units further include a first clause sequence, the first clause sequence comprising a condition expression sequence, the first clause sequence acting as the optional node in the to-be-compiled statement, and the condition expression sequence acting as the mandatory node of the first clause sequence.

12. The method of claim 11, wherein when an expression condition in the condition expression sequence in the to-be-compiled statement is incorrect, the recursively querying whether the parent node is the optional node of the corresponding upper-level parent node comprises:
    querying whether the condition expression sequence is the optional node in the first clause sequence; and
    querying to determine the first clause sequence is the optional node in the to-be-compiled statement, in response to determining that the condition expression sequence is not the optional node in the first clause sequence.

13. The method of claim 11, wherein the deleting the syntax unit corresponding to the parent node and compiling the remaining correct syntax units in the to-be-compiled statement comprises:
    deleting the syntax unit corresponding to the first clause sequence; and
    compiling the remaining correct syntax units in the to-be-compiled statement.

14. An apparatus comprising:
    one or more processors; and
    memory stored therein a plurality of modules or units, executable by the one or more processors, that comprise:
    a detection module configured to detect, according to a preset syntax, whether a syntax unit that has a syntax error exists in a to-be-compiled statement, the preset syntax indicating one or more optional nodes that are labeled as optional;
    a determining module configured to determine whether a child node at which the syntax unit is located is an optional node of a corresponding parent node, in response to determining that the syntax unit exists in the to-be compiled statement, the child node including a statement with the syntax error;
    a first execution module configured to delete the syntax unit, in response to determining that the child node at which the syntax unit is located is the optional node of the corresponding parent node; and
    a compiling module configured to compile remaining correct syntax units in the to-be-compiled statement.

15. The apparatus of claim 14, wherein the apparatus further comprises:
    a query module configured to recursively querying whether the parent node is the optional node of a corresponding upper-level parent node, in response to determining that the child node at which the syntax unit is located is not the optional node of the corresponding parent node; and
    a second execution module configured to delete the syntax unit corresponding to the parent node and compile remaining correct syntax units in the to-be-compiled statement, in response to determining that the parent node is the optional node of the corresponding upper-level parent node.

16. The apparatus of claim 15, wherein the to-be-compiled statement comprise multiple syntax units including:
    a select clause sequence; and
    a source clause sequence,
    wherein:
    the select clause sequence comprises:
    a select list, a column in the select list being the optional node in the select list; and
    the source clause sequence comprises:
    a source table name and/or a source alias, the source alias being the optional node in the source clause sequence.

17. The apparatus of claim 16, wherein the determining module comprises:

a first determining unit configured to determine whether each column in the select list has the syntax error, in response to determining that the syntax unit is the select list in the select clause sequence;

a second determining unit configured to determine whether at least one column in the select list has the syntax error, in response to determining that not each column in the select list has the syntax error;

a third determining unit configured to determine whether the select list is the optional node in the select clause sequence, in response to determining that at least one column in the select list has the syntax error; and a fourth determining unit configured to determine that the to-be-compiled statement is an illegal statement, in response to determining that each column in the select list has the syntax error.

18. The apparatus of claim 14, wherein:

the compiling module is further configured to, after the recursively querying whether the parent node is the optional node of the corresponding upper-level parent node, compile a column with correct syntax in the select list, in response to determining that a query result is that the select list is a mandatory node in the select clause sequence.

19. The apparatus of claim 16, wherein the determining module comprises:

a fifth determining unit configured to, when the syntax unit is the source alias in the source clause sequence, determine whether the source alias is the optional node in the source clause sequence.

20. The apparatus of claim 16, wherein the first execution module comprises:

a first execution unit configured to, when the source alias is the optional node in the source clause sequence, delete the syntax unit corresponding to the source alias and compile remaining correct syntax units in the to-be-compiled statement.

* * * * *